United States Patent
Wong

(10) Patent No.: US 11,172,678 B2
(45) Date of Patent: Nov. 16, 2021

(54) METHODS OF PEST CONTROL

(71) Applicant: TLC Products, Cleveland, OH (US)

(72) Inventor: John M. Wong, Bay Village, OH (US)

(73) Assignee: TLC Products, Cleveland, OH (US)

( * ) Notice: Subject to any disclaimer, the term of this patent is extended or adjusted under 35 U.S.C. 154(b) by 0 days.

(21) Appl. No.: 15/869,254

(22) Filed: Jan. 12, 2018

(65) Prior Publication Data

US 2018/0317499 A1 Nov. 8, 2018

Related U.S. Application Data

(60) Provisional application No. 62/501,500, filed on May 4, 2017.

(51) Int. Cl.
| | |
|---|---|
| *A01N 25/12* | (2006.01) |
| *A01N 37/46* | (2006.01) |
| *A01N 59/06* | (2006.01) |
| *A01N 33/12* | (2006.01) |
| *A01N 43/16* | (2006.01) |
| *A01N 63/50* | (2020.01) |
| *A01N 63/22* | (2020.01) |

(52) U.S. Cl.
CPC ............ *A01N 25/12* (2013.01); *A01N 33/12* (2013.01); *A01N 37/46* (2013.01); *A01N 43/16* (2013.01); *A01N 59/06* (2013.01); *A01N 63/22* (2020.01); *A01N 63/50* (2020.01)

(58) Field of Classification Search
CPC ........ A01N 63/00; A01N 25/12; A01N 63/50; A01N 63/22; A01N 33/12; A01N 37/46; A01N 43/16; A01N 59/06
USPC .......................................................... 435/41
See application file for complete search history.

(56) References Cited

U.S. PATENT DOCUMENTS

| | | | |
|---|---|---|---|
| 6,524,998 B1 * | 2/2003 | Kloepper | ............... A01N 63/00 504/100 |
| 2010/0272701 A1 | 10/2010 | Chen | |
| 2011/0189143 A1 * | 8/2011 | Brower | .................. A01N 25/00 424/93.43 |
| 2012/0329650 A1 * | 12/2012 | Lopez-Cervantes | ... A01N 43/16 504/101 |
| 2014/0212376 A1 | 7/2014 | Valdes Escobar et al. | |
| 2016/0058016 A1 | 3/2016 | Villegas Escobar et al. | |

FOREIGN PATENT DOCUMENTS

| | | |
|---|---|---|
| CN | 101712927 A | 5/2010 |
| EP | 3 251 512 A1 | 12/2017 |
| WO | WO 2013148278 A1 | 10/2013 |

OTHER PUBLICATIONS

Wikipedia, Bacillus pumilus, Accessed Jan. 14, 2020, Available Online at: en.wikipedia.org/wiki/Bacillus_pumilus.*
Narayana et al., Chitinase Production by *Streptomyces* Sp. ANU 6277, Brazilian Journal of Microbiology, vol. 40, (2009), pp. 725-733.*
Min-Soo Heu et al: "Components and nutritional quality of shrimp processing by-products," Food Chemistry, vol. 82, No. 2, Aug. 1, 2003, pp. 235-242.
Sato, Yuzuro: "Identification of Inducers for Chitinase B Production in Bacillus cereus CH and Estimation of its Induction Mechanism," Journal of Environmental Biotechnology, Jan. 1, 2008, pp. 119-121.
Wang S L et al: "Bioconversion of shellfish chitin wastes for the production of Bacillus subtilis W-118 chitinase," Carbohydrate Research, Pergamon, GB, vol. 341, No. 15, Nov. 6, 2006, pp. 2507-2515.
International Search Report for PCT Application No. PCT/US2018/013447 dated Mar. 22, 2018.

* cited by examiner

*Primary Examiner* — Jennifer M. H. Tichy
(74) *Attorney, Agent, or Firm* — Fay Sharpe LLP; George Huang

(57) ABSTRACT

Methods of controlling agricultural pests are disclosed. An aerated liquid mixture is formed from a composition containing a bacterial nutrient source, a nitrogen-containing compound, a phosphate-containing compound, a magnesium-containing compound, a buffer, a chitinase inducer, and at least one strain of bacteria that produces chitinase. The liquid mixture is administered to soil and plants, and acts as an organic biological pesticide.

14 Claims, 16 Drawing Sheets

METHODS OF PEST CONTROL

CROSS-REFERENCE TO RELATED APPLICATIONS

This application claims priority to U.S. Provisional Patent Application Ser. No. 62/501,500, filed on May 4, 2017. The entirety of that application is hereby fully incorporated by reference.

BACKGROUND

The present disclosure relates to methods for controlling pests, particularly agricultural pests that infest and reduce yield in commercial agriculture, namely through optimizing production of chitin degrading enzymes and other extracellular enzymes. Compositions for use in such methods are also disclosed.

Various pests attack crops and are detrimental to plant health. Examples of such pests include nematodes or roundworms such as root-knot nematodes. Other crop infestations can include black sigatoka, a leaf-spot disease of banana plants caused by the fungus *Mycosphaerella fijiensis*, which is the main fungal disease affecting banana crops; and beetles such as *Monochamus alternatus*. Many other plant diseases are caused by fungal organisms, such as *botrytis* and powdery mildew. Generally speaking, plant cell walls contain cellulose, while fungal cell walls contain chitin.

In order to manage such infestations, plants may be rotated or treated with natural antagonists, including biopesticides. Biopesticides, a common contraction of "biological pesticides", include several types of pest management. Commonly associated with biological control, biopesticides are obtained from organisms including plants, bacteria and other microbes, fungi, nematodes, etc. Such components have served as substitutes to synthetic chemical plant protection products.

BRIEF DESCRIPTION

Disclosed in various embodiments herein are methods for controlling pests. This is accomplished in part by administering an aerated liquid mixture that acts as a biopesticide. The aerated liquid mixture can be made by mixing water with a dry composition that comprises at least one strain of bacteria that produces chitinase; a bacterial nutrient source; a nitrogen-containing compound; a phosphate-containing compound; a magnesium-containing compound; a buffer; and a chitinase inducer. The aerated liquid mixture is a more potent biopesticide than the non-aerated liquid mixture. The non-aerated liquid mixture, applied directly to soil or as a foliar spray shows some efficacy, while the aerated mixture shows dramatically enhanced efficacy.

The aeration process for this liquid mixture results in the enhanced production of various extracellular enzymes that promote plant growth by attacking plant pests. Such enzymes include chitinase, protease, amylase, and lipase, which are expected to operate at the root/soil interface (i.e. the rhizosphere) when applied directly to the soil. The same mixture applied as a foliar spray will operate against plant fungal infections. The liquid mixture is also non-toxic to animals and humans.

In some aspects, the present disclosure is directed to dry compositions, and method of utilizing the same, to reduce nematode populations. The dry compositions contain a bacterial nutrient source, a chitinase inducer, and at least one strain of bacteria that produces chitinase. Other ingredients include a nitrogen-containing compound; a phosphate-containing compound; a magnesium-containing compound; and a buffer.

The at least one strain of bacteria that produce chitinase can be selected from *Bacillus, Aeromonas, Serratia, Vibrio, Streptomyces, Pseudomonas*, or *Klebsiella*. In particular embodiments, the bacteria comprises *Bacillus licheniformis, Bacillus pumilis, Bacillus amyloliquefaciens*, and/or *Bacillus subtilis.*

The nitrogen-containing compound may be selected from a group comprising ammonium chloride, ammonium nitrate, ammonium sulfate, and ammonium phosphate. In particular embodiments, the nitrogen-containing compound is ammonium chloride.

The phosphate-containing compound may be selected from a group comprising dipotassium phosphate, phosphoric acid, diammonium phosphate, disodium phosphate, monosodium phosphate, and sodium tripolyphosphate. In particular embodiments, the phosphate-containing compound is dipotassium phosphate.

The magnesium-containing compound may be selected from a group comprising magnesium sulfate and magnesium chloride. In particular embodiments, the magnesium-containing compound is magnesium sulfate.

The buffer may be selected from a group comprising baking soda or soda ash (i.e. sodium carbonate). In particular embodiments, the buffer is baking soda.

The chitinase inducer is a substance that promotes the production of chitinase from the bacteria. The chitinase inducer can be chitin (e.g. colloidal or finely milled/ground), cellulose, keratin, chitosan, or a chitin derivative such as N-acetylglucosamine (GlcNAc) oligomers.

In yet another additional aspect, the present disclosure relates to methods for preparing an aerated liquid mixture for pest control. Water is combined with a dry composition as described above to obtain a liquid mixture. The liquid mixture is then aerated for a first time period at a first temperature to produce an aerated liquid mixture containing at least chitinase, and potentially other extracellular enzymes as well.

About 1 to 2 pounds of the dry composition is combined with from 100 liters to 400 liters of water. The first time period may be from about 8 hours to about 168 hours, or from about 24 hours to about 120 hours, or from about 48 hours to about 72 hours. The first temperature may be from about 15° C. to about 40° C., or from about 23° C. to about 40° C., or from about 23° C. to about 30° C. The liquid mixture may remain within a pH range of about 6.5 to about 9.5 during the aerating.

In a third aspect, the present disclosure relates to aerated liquid mixtures made using the dry compositions and methods described herein. Such aerated liquid mixtures may contain at least 25 U/mL of chitinase, and can also contain other enzymes such as cellulase, amylase, protease, or lipase.

In a fourth aspect, the present disclosure relates to methods of controlling nematodes and/or fungal infections around plants, by spraying an aerated liquid mixture on or around the plants, wherein the aerated liquid mixture is produced as described above. 100 liters of the aerated liquid mixture is generally applied on about 2000 square meters ($m^2$) to about 4000 $m^2$ of ground containing the plants.

The plants treated by these liquid mixtures and methods can be flowers, green plants, woody plants or crops such as vegetables, fruit, corn, wheat, soybeans, etc. The pests that are controlled by these methods can include nematodes and fungi containing chitin in their cell walls. Desirably, the administration of the aerated liquid mixtures is toxic to pests, including nematodes and plant pathogenic fungi.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

Figure 1:
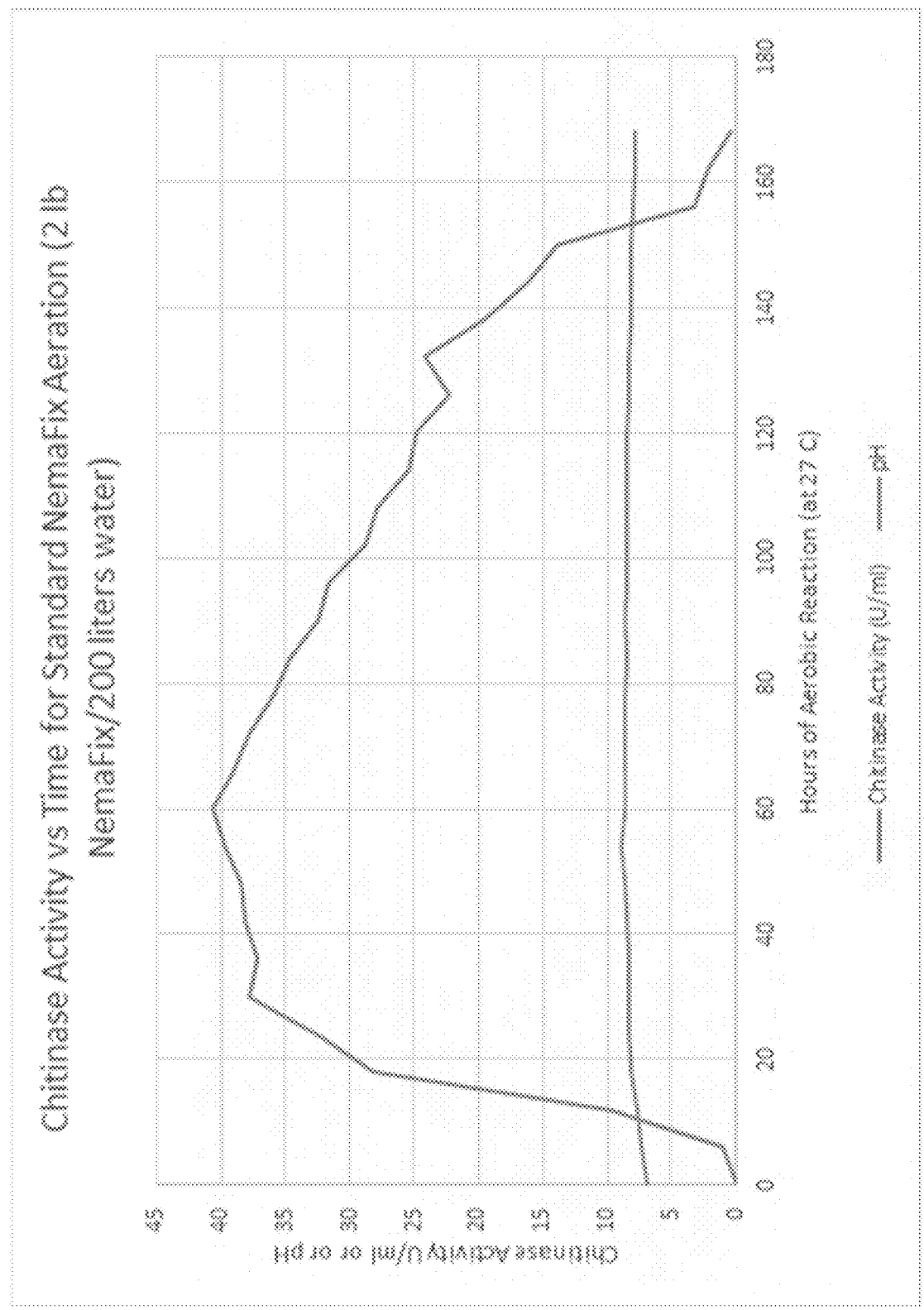
FIG. 1 is a graphical representation of chitinase activity over 180 hours following combining two pounds of the dry powder mix with 200 liters of water and aerating the mixture. The pH is also shown, and is on the same scale as the chitinase activity.

FIG. 2 is a graphic representation of immotile/paralyzed J2 nematodes of mixed *Meloidogyne* spp. populations.

FIG. 3 is an image taken at 100× magnification of immobilized J2 nematodes of mixed *Meloidogyne* spp. suspended in Product 1.

FIG. 4 is an image taken at 100× magnification of immobilized J2 nematodes of mixed *Meloidogyne* spp. suspended in Product 2.

FIG. 5 is an image taken at 100× magnification of immobilized J2 nematodes of mixed *Meloidogyne* spp. suspended in Product 3.

FIG. 6 is an image taken at 100× magnification of both immobilized and moving J2 of mixed *Meloidogyne* spp. suspended in Product 5.

FIG. 7 is an image taken at 100× magnification moving J2 nematodes of mixed *Meloidogyne* spp. suspended in Product 6 (sterile tap water control).

FIG. 8 is an image taken at 100× magnification of immobilized J2 nematodes of mixed *Meloidogyne* spp. suspended in Product 7 (70% ethanol negative control).

FIGS. 9A-9F are a set of six graphs showing the results of tests that used three different amounts and two different types of biopesticide (powder and liquid). In each graph, the y-axis is the ED Score, and runs from 0 to 450 in increments of 50. The x-axis is days, and runs from 0 to 98 in increments of 14. The powdered variants (which contained chitin) worked better than the liquid variants (which did not contain chitin or chitinase).

FIG. 10 is a diagram illustrating the arrangement of the treatment blocks and treatment cells used in an experiment comparing a conventional fungicide, a non-activated powder version of a composition of the present disclosure, and an activated liquid version of the composition.

FIG. 11 is a graph comparing the ED scores for the three different treatments over time. The y-axis is the ED Score, and runs from 0 to 350 in increments of 50. The x-axis is days, and runs from 0 to 35 in increments of 7. T1 (Phyton-27) is in squares, T2 (PV) is in circles, and T3 (LAV) is in triangles.

DETAILED DESCRIPTION

The present disclosure may be understood more readily by reference to the following detailed description of desired embodiments and the examples included therein. In the following specification and the claims which follow, reference will be made to a number of terms which shall be defined to have the following meanings.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function. Furthermore, it should be understood that the drawings are not to scale.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The term "about" can be used to include any numerical value that can vary without changing the basic function of that value. When used with a range, "about" also discloses the range defined by the absolute values of the two endpoints, e.g. "about 2 to about 4" also discloses the range "from 2 to 4." The term "about" may refer to plus or minus 10% of the indicated number.

The term "rhizosphere" refers to the narrow region of soil that is directly influenced by root secretions and associated soil microorganisms.

The present application relates to methods for controlling pests using liquid mixtures that contain high amounts of chitin degrading enzymes (i.e. chitinase) and other extracellular enzymes such as protease, amylase, and lipase. The liquid mixtures are made by combining water with a dry composition. The liquid mixtures can be used in this form, or can be made even more effective through aerating. The dry compositions contain bacteria that produce the enzymes, and may also include a nutrient mix to support the growth of the bacteria. When these compositions are applied to the rhizosphere, they slow the motility of unwanted pests such as nematodes. When these compositions are applied to plant surfaces (above the ground), they slow the growth and reduce the pathogenicity of fungal infections. These same bacteria may also provide plant growth promoting benefits, whether applied to the rhizosphere or to plant surfaces above the ground.

Plants that may be treated include vegetables, fruits, flowers, basic green leafy plants, and crops, including corn. Unwanted pests namely include nematodes, but may also include other crop infestations, such as Black Sigatoka, a leaf-spot disease of banana plants caused by the ascomycete fungus *Mycosphaerella fijiensis*, and fungi containing chitin in their cell walls. Other unwanted pests such as beetles, and other pests that include chitin in their structure at one stage or another of their life cycle, will be controlled by the liquid mixture.

Initially, the dry bacterial composition comprises at least one strain of bacteria that produces chitinase; a bacterial nutrient source; a nitrogen-containing compound; a phosphate-containing compound; a magnesium-containing compound; a buffer; and a chitinase inducer.

The bacteria that produces chitinase may come from any one of the genera *Bacillus, Aeromonas, Serratia, Vibrio, Streptomyces, Pseudomonas,* and *Klebsiella*. It is noted that one or more different strains/species of bacteria can be present in the dry composition. With respect to *Bacillus, B. licheniformis, B. pumilis, B. amyloliquefaciens,* and *B. subtilis* are specifically contemplated for use. *B. licheniformis* may be used to produce chitinase or cellulase at a high rate. Such strains of *B. licheniformis* may be produced through plating the strain using media that elucidates chitinase production, then growing and plating repeatedly and in a cyclic fashion so as to express enhanced cellulose and chitinase production ability. Desirably, the bacteria (singular or plural) that is/are used should be selected to produce chitinase, as well as additional enzymes such as protease, amylase, lipase, and/or cellulase.

Bacteria of the same species or different species may be used in any ratio to one another. In particular embodiments, it is contemplated that *B. licheniformis, B. pumilis,* and *B. amyloliquefaciens* are used. *B. licheniformis* can have a high cellulose production rate and/or a high chitinase production rate. *B. pumilis* is known to promote plant growth. *B. amyloliquefaciens* produces protease, amylase, and lipase at high rates. In particular embodiments, the weight ratio of *B. licheniformis* to (*B. pumilis*+*B. amyloliquefaciens*) is from about 2:1 to about 3:1. *B. subtilis* is also contemplated as a useful organism, as it is easy to manufacture and is well known for extracellular enzyme production capability. *Bacillus* bacteria have several desirable traits. They survive lyophilization and/or spray drying, and have a long shelf life once dried, and so are useful in a dry powder mixture.

It is contemplated that the at least one strain of bacteria is present in the dry composition in an amount of at least $1\times10^6$ CFU (i.e. 1E6 CFU) per gram of dry powder (in the dry composition). In further embodiments, the at least one strain of bacteria is present in the amount of from about $1\times10^{10}$ CFU to about $5\times10^{12}$ CFU per kilogram (Kg) of dry powder, including from about $1\times10^{11}$ CFU to about $1\times10^{12}$ CFU per Kg of dry powder. A higher concentration of bacteria in CFU per Kg dry powder may be used, but amounts beyond the ranges noted herein do not appear to be any more effective. These CFU numbers may be considered the "total" amount of bacteria as well when more than one species of bacteria is used. The term "CFU" refers to colony-forming units.

The at least one strain of bacteria is/are present to produce enzymes that will attack pests. These enzymes include chitinase, protease, amylase, lipase, and/or cellulase. Chitinase breaks down glycosidic bonds in chitin. Proteases generally break down proteins by hydrolyzing peptide bonds. Amylases break down long-chain carbohydrates (i.e. starch) by hydrolysis. Lipases hydrolyze fats/lipids. Cellulases break down cellulose into simple sugars.

The bacterial nutrient source acts as a source of organic carbon and bacterial growth factors such as amino acids and vitamins. Many different compounds can be used, either individually or in a mixture. Some examples of materials that could be used as a bacterial nutrient source include peptone, tryptone, casein, amino acids, vitamins, beef extract, and yeast extract. Peptone refers to a protein derivative obtained by partial hydrolysis of proteins, and is commonly used in cell culture media. Tryptone is commonly obtained by digestion of casein by trypsin, and is commonly used to make cell culture broth. In particular embodiments, yeast extract is used as the bacterial nutrient source. Yeast extract is made generally by extracting the cell contents of yeast, such as by autolysis. The yeast from which the yeast extract is derived is generally of the class *Saccharomyces*. It is particularly contemplated that the yeast is *Saccharomyces cerevisiae* (commonly known as baker's yeast). The bacterial nutrient source (and particularly the yeast extract) may comprise from about 3 wt % to about 95 wt %, or from about 33 wt % to about 93 wt %, or greater than 50 wt %, or from about 70 wt % to about 80 wt % of the dry composition. The bacterial nutrient source is usually the majority of the dry composition.

The nitrogen-containing compound may be any source that can provide ammonia, directly or indirectly, to assist the bacteria in growing and reproducing. Compounds that would add ammonia indirectly include compounds such as urea or proteins. However, direct sources of ammonia are preferred so that no intermediate steps are required to liberate the ammonia and make it available as a food source. In particular embodiments, the nitrogen-containing compound may be at least one of ammonium chloride, ammonium nitrate, ammonium sulfate, or an ammonium phosphate. In specific embodiments, the nitrogen-containing compound is ammonium chloride. It is contemplated that the nitrogen-containing compound may comprise from about 0.1 wt % to about 5 wt %, or from about 0.25 wt % to about 3 wt %, or from about 1 wt % to about 2 wt %, or from about 1 wt % to about 1.5 wt % of the dry composition.

The phosphate-containing compound should be added in the most bioavailable form, namely soluble orthophosphate. In particular embodiments, the phosphate-containing compound may be at least one of dipotassium phosphate, phosphoric acid, diammonium phosphate, disodium phosphate, monosodium phosphate, and sodium tripolyphosphate. In specific embodiments, the phosphate-containing compound is dipotassium phosphate. It is contemplated that the phosphate-containing compound may comprise from about 0.1 wt % to about 5 wt %, or from about 0.1 wt % to about 1 wt %, or from about 0.5 wt % to about 0.75 wt % of the dry composition.

The magnesium-containing compound may be any non-toxic source of divalent magnesium. Possible compounds include magnesium sulfate and magnesium chloride. In specific embodiments, the magnesium-containing compound is magnesium sulfate. It is contemplated that the magnesium-containing compound may comprise from about 0.1 wt % to about 5 wt %, or from about 0.1 wt % to about 1 wt %, or from about 0.5 wt % to about 0.75 wt % of the dry composition.

The buffer is intended to maintain the pH level of the liquid mixture once the dry composition is combined with water and aerated. The buffer should keep the pH level of the composition between 6.5 and 9.5 throughout the duration of the aeration period. In particular embodiments, the buffer may be baking soda or soda ash (i.e. sodium carbonate). In specific embodiments, the buffer is baking soda. It is contemplated that the buffer may comprise from about 5 wt % to about 20 wt %, or from about 7 wt % to about 16 wt %, or from about 12 wt % to about 15 wt % of the dry composition.

The chitinase inducer is a substance that promotes the production of chitinase from the bacteria. The chitinase inducer can be chitin (e.g. colloidal or finely milled/ground), cellulose, keratin, chitosan, or a chitin derivative.

Preferably, chitin is used as the chitinase inducer. The chitin may be sourced from a number of substances, including cell walls of fungi, exoskeletons of arthropods such as crustaceans (e.g., shrimp and crabs) and insects, radulae of mollusks, beaks and internal shells of cephalopods, and scales and soft tissues of fish and amphibians. In particular embodiments, the chitin is sourced from crab shells and shrimp shells. The chitin may be milled so as to pass through standard 325 mesh (i.e. openings of 0.0017 inches or 44 micrometers). The chitin may be added in an amount from about 0.1 wt % to about 15 wt %, or from about 0.1 wt % to about 5 wt %, or from about 1 wt % to about 2 wt % of the dry composition.

Desirably, the dry composition does not include the presence of any starches or sugars. Inclusion of low levels of soluble sugars or starch exerts a strong repressive effect on chitinase production.

The bacterial composition is dry, i.e. it does not contain added water. The dry bacterial composition can be provided in the form of a powder, granules, or pellets. Normal hydration from atmospheric moisture does not severely impair the composition efficacy, but can shorten its shelf life. It is noted that yeast extract (which can be used as the bacterial nutrient source) is hygroscopic, and will pick up moisture from the air when the composition is not completely sealed.

The dry bacterial composition is used to prepare a liquid mixture that is subsequently applied to the ground/plants for pest control. Water is combined with the dry bacterial composition to form an initial or starting liquid mixture. This liquid mixture alone, when applied to soil or as a foliar spray, will have some efficacy against the agricultural pests described herein. However, to increase the efficacy dramatically, the starting mixture is then aerated for a first period of time at a first temperature to produce the aerated liquid mixture. The aerated liquid mixture contains enzymes that include chitinase and others such as protease, amylase, lipase and cellulase. The aerated liquid mixture is about 5 to 10 times more effective than the non-aerated liquid mixture.

To make the mixture, between 1 pound and 2 pounds of the powdered bacterial composition is combined with 100 liters to 400 liters of water. Put another way, the weight/volume ratio of the dry composition to the water is from about 0.0025 lb/liter to about 0.02 lb/liter. In specific embodiments, two pounds of the powdered bacterial composition is added to 200 liters of water. When the soluble organic content in the liquid mixture is too high, useful extracellular enzyme synthesis is repressed until too late in the aerobic growth of the liquid mixture for practical use in real-world pest control applications.

The bacterial composition and water mixture is then aerated using medium bubble aeration sufficiently vigorous to provide oxygenation and good mixing. The aeration lasts for a first time period of from about 8 hours to about 168 hours, or from about 24 hours to about 120 hours, or from about 48 hours to about 72 hours, or in specific embodiments, about 72 hours. In this regard, enzyme production generally begins at 12 to 24 hours and continues through a maximum production rate from 24 hours to 72 hours, with a gradual diminishing production rate after 72 hours.

The mixture may be aerated at a first temperature of from about 15° C. to about 40° C., or from about 23° C. to about 40° C., or from about 23° C. to about 30° C. In specific embodiments, the mixture is aerated from 48 hours to 72 hours at 27° C. As previously mentioned, the liquid mixture desirably remains within a pH range of about 6.5 to about 9.5 during the aerating.

The resulting aerated liquid mixture desirably contains at least 25 units/mL (U/mL) of chitinase. The aerated liquid mixture may also contain other enzymes such as cellulase, amylase, protease, or lipase. One unit of chitinase activity is defined as the amount of enzyme that yields 1 µmol of reducing sugar as N-acetyl-D-glucosamine (GlcNAc) equivalent per minute.

The present disclosure also contemplates methods of controlling pests, such as nematodes and fungal infections, in plants, comprising spraying the aerated liquid mixture directly to the soil, or as a foliar spray. This aerated mixture may be applied to crops and plants requiring pest control. For mild problems (i.e. up to 25% expected or typical crop loss), 100 liters of aerated mixture applied per 4000 $m^2$ every 2-4 weeks should adequately control the pests. For moderate problems (i.e. 25-50% expected or typical crop loss), 100 liters of aerated mixture applied per 4000 $m^2$ every 1-2 weeks should adequately control the pests. For severe problems (i.e. greater than 50% expected or typical crop loss), 100 liters of aerated mixture applied per 2000 $m^2$ every seven days should adequately control the pests.

The present disclosure is further illustrated in the following non-limiting working examples, it being understood that these examples are intended to be illustrative only and that the disclosure is not intended to be limited to the materials, conditions, process parameters and the like recited herein.

EXAMPLES

First Set of Experiments

The effect of a bacterial composition on the motility of root-knot (*Meloidogyne* spp.) second-stage juvenile (J2) nematodes was determined.

Materials and Methods

A 75 pound dry powder mix of the bacterial composition was prepared according to Table 1 below.

TABLE 1

| Common Name | Chemical Name | Amount |
|---|---|---|
| Yeast extract | Yeast extract | 56 pounds, 4 ounces |
| Baking soda | Sodium bicarbonate | 10 pounds, 2 ounces |
| Ammonia | Ammonium chloride | 1 pound |
| Phosphate | Dipotassium phosphate | 0.5 pounds |
| Epsom salt | Magnesium sulfate | 0.5 pounds |
| Bacteria | *B. licheniformis* (high rate cellulase production) | 1.14E12 cfu |
| Bacteria | *B. licheniformis* (high rate chitinase production) | 4.26E12 cfu |
| Bacteria | *B. pumilis* | 1.14E12 cfu |
| Bacteria | *B. amyloliquefaciens* | 1.14E12 cfu |
| Crab shell | Chitin | 1 pound |
| Shrimp shell | Chitin | 6 ounces |

Two different strains of *B. licheniformis* were used. The first strain had a high rate of cellulase production, while the second strain had a high rate of chitinase production. *B. pumilis* is known as an excellent plant growth promoting bacterium. *B. amyloliquefaciens* is known as a strong producer of protease, amylase and lipase.

The crab shells and shrimp shells were milled so as to pass through a 325 mesh standard screen.

Four 600 $m^2$ plots of mustard plant mulch in a *chrysanthemum* field were treated with heated steam so as to create a zero baseline of infestation.

A first preparation and application of the dry powder mix was initiated by diluting 200 grams powdered bacterial composition with 50 liters of water. The mixture was then aerated vigorously with diffused air at 27° C. for 48 hours. After 48 hours, the aerated mixture was applied to a first 600 m$^2$ plot of mustard plant mulch. The first 600 m$^2$ plot of mustard plant mulch was treated every two weeks with the aerated mixture.

For comparison, a second preparation of the dry powder mix was also made by diluting 200 grams powdered bacterial composition with 50 liters of water. No aeration was performed with this second preparation. The second preparation was applied to a second 600 m$^2$ plot of mustard plant mulch. The second 600 m$^2$ plot of mustard plant mulch was treated every two weeks with the mixture.

Water was used as one control, and 70% ethanol was used as a negative control, as ethanol kills nematodes, on two other 600 $m^2$ plots of mustard plant mulch in a *chrysanthemum* field.

Results

The first preparation (aerated liquid mixture) was shown to kill J2 nematodes, which were observed as immotile or paralyzed.

However, the second preparation (non-aerated) did not affect J2 nematodes, as inspection of the mulch revealed motile J2 nematode activity. In this example, the preparation mixed with water but without aeration did not noticeably reduce J2 nematode activity.

Second Set of Experiments

The effect of chitin on the motility of root-knot (*Meloidogyne* spp.) second-stage juvenile (J2) nematodes was determined.

Materials and Methods

A bacterial composition was prepared according to Table 2 below. This differs from the composition of Table 1 by not including chitin.

TABLE 2

| Common Name | Chemical Name | Amount |
|---|---|---|
| Yeast extract | Yeast extract | 56 pounds, 4 ounces |
| Baking soda | Sodium bicarbonate | 10 pounds, 2 ounces |
| Ammonia | Ammonium chloride | 1 pound |
| Phosphate | Dipotassium phosphate | 0.5 pounds |
| Epsom salt | Magnesium sulfate | 0.5 pounds |
| Bacteria | *B. licheniformis* | 1.14E12 cfu |
| Bacteria | *B. licheniformis* | 4.26E12 cfu |
| Bacteria | *B. pumilis* | 1.14E12 cfu |
| Bacteria | *B. amyloliquefaciens* | 1.14E12 cfu |

Approximately 200 grams of the bacterial composition was mixed with 50 liters of water. This mixture was then applied to a 600 $m^2$ plot of mustard plant mulch in a *chrysanthemum* field treated with heated steam.

No effect on J2 nematode mobility was observed. Inspection of the mulch revealed nematode activity. In other words, chitin was needed to have an effect on J2 nematode activity.

Third Set of Experiments

Chitinase activity was assayed by measuring reducing sugar released from colloidal chitin.

Materials and Methods 150 microliters (μL) crude enzyme was added to a mixture consisting of 300 μL of 0.1% colloidal chitin and 150 μL of 0.1 M phosphate buffer (pH 7.0). After incubation at 55° C. for 10 minutes, the reaction mixture was subjected to a refrigerated centrifugation at 10,000 rpm for 5 minutes. The resulting supernatant (200 μL) was added with 500 ml of deionized water and 1000 ml of Schales reagent and then boiled for 10 minutes. After cooling, the absorbance of the mixture was measured at 420 nm. One unit of the chitinase activity was defined as the amount of enzyme that yields 1 μmol of reducing sugar as N-acetyl-D-glucosamine (GlcNAc) equivalent per minute.

Two pounds of bacterial composition prepared according to Table 3 below was added to 200 liters of tap water, preheated then maintained at 27° C. The mixture was then vigorously aerated and assays were performed at 6 hour intervals.

TABLE 3

| Common Name | Chemical Name | Amount |
|---|---|---|
| Yeast extract | Yeast extract | 56 pounds, 4 ounces |
| Baking soda | Sodium bicarbonate | 10 pounds, 2 ounces |
| Ammonia | Ammonium chloride | 1 pound |
| Phosphate | Dipotassium phosphate | 0.5 pounds |
| Epsom salt | Magnesium sulfate | 0.5 pounds |
| Bacteria | *B. licheniformis* | 1.14E12 cfu |
| Bacteria | *B. licheniformis* | 4.26E12 cfu |
| Bacteria | *B. pumilis* | 1.14E12 cfu |
| Bacteria | *B. amyloliquefaciens* | 1.14E12 cfu |
| Crab shell | Chitin | 1 pound |
| Shrimp shell | Chitin | 6 ounces |

Results

FIG. 1 graphically illustrates the chitinase activity over 180 hours of aerobic reaction at 27° C. As can be seen, chitinase activity increased logarithmically between 0 and 60 hours, peaking at 60 hours, and then evenly decreased until nearly 130 hours before steeply declining. The chitinase activity reached 25 U/mL at about 18 hours, peaked at about 41 U/mL at about 60 hours, and decreased back down to 25 U/mL at about 115 hours.

Fourth Set of Experiments

Materials and Methods

To obtain freshly hatched J2 nematodes of a mixed *Meloidogyne* spp.: *M. incognita* and *M. javanica* (80:20 ratio), infected tomato roots of 30-day-old seedlings were removed from the pots in which they were grown and washed under running tap water. Eggs were extracted separately using an adapted NaOCl method (Riekert, 1995). Second-stage juveniles (J2) were subsequently obtained by hatching the extracted eggs according to the method by Moura et al. (1993) at 25±1° C. Second-stage juveniles that were recovered after the first 24 hours were discarded and only those collected after the next 24 hours were used for all the experiments.

Seven treatments were prepared according to the following dilutions listed below in Table 4.

TABLE 4

| Product Name | Preparation |
|---|---|
| Product 1 | 2 lbs Composition of Table 3, in 200 liters water, aerated for 48 hours |
| Product 2 | 1 lb Composition of Table 3, in 200 liters water, aerated for 24 hours |
| Product 3 | 2 lbs Composition of Table 3, in 200 liters water, aerated for 96 hours |

TABLE 4-continued

| Product Name | Preparation |
| --- | --- |
| Product 4 | 1 lb Composition of Table 3, in 200 liters water, aerated for 48 hours |
| Product 5 | 1 lb Composition of Table 3, in 200 liters water, NOT AERATED AT ALL |
| Product 6 | Sterile tap water (control) |
| Product 7 | 70% ethanol (negative control) |

One mL of the treatment was transferred to plastic well-plates, and approximately 100 actively moving J2 nematodes of the mixed *Meloidogyne* spp. contained in 90-µL sterile tap water were added to each of the different treatments in each well. The well-plates were subsequently incubated in a dark, temperature-regulated cabinet (25° C.±1° C.). Motility of the J2 nematodes was recorded after 24 hours, 48 hours and 72 hours after exposure to the treatments by counting the number of motile and non-motile J2 nematodes. Second-stage juveniles were considered non-motile when no movement occurred after being observed for 30 seconds to 1 minute using a stereo microscope at 100× magnification.

Data were subjected to Anova (Statistica 13), with means being separated by the Tukey test ($P \leq 0.05$).

Results

As shown in FIGS. 4-10, there were significant differences in treatments with regard to their effects on J2 nematode motility, among the three time intervals, and interaction between time intervals and treatments.

Figure 2:
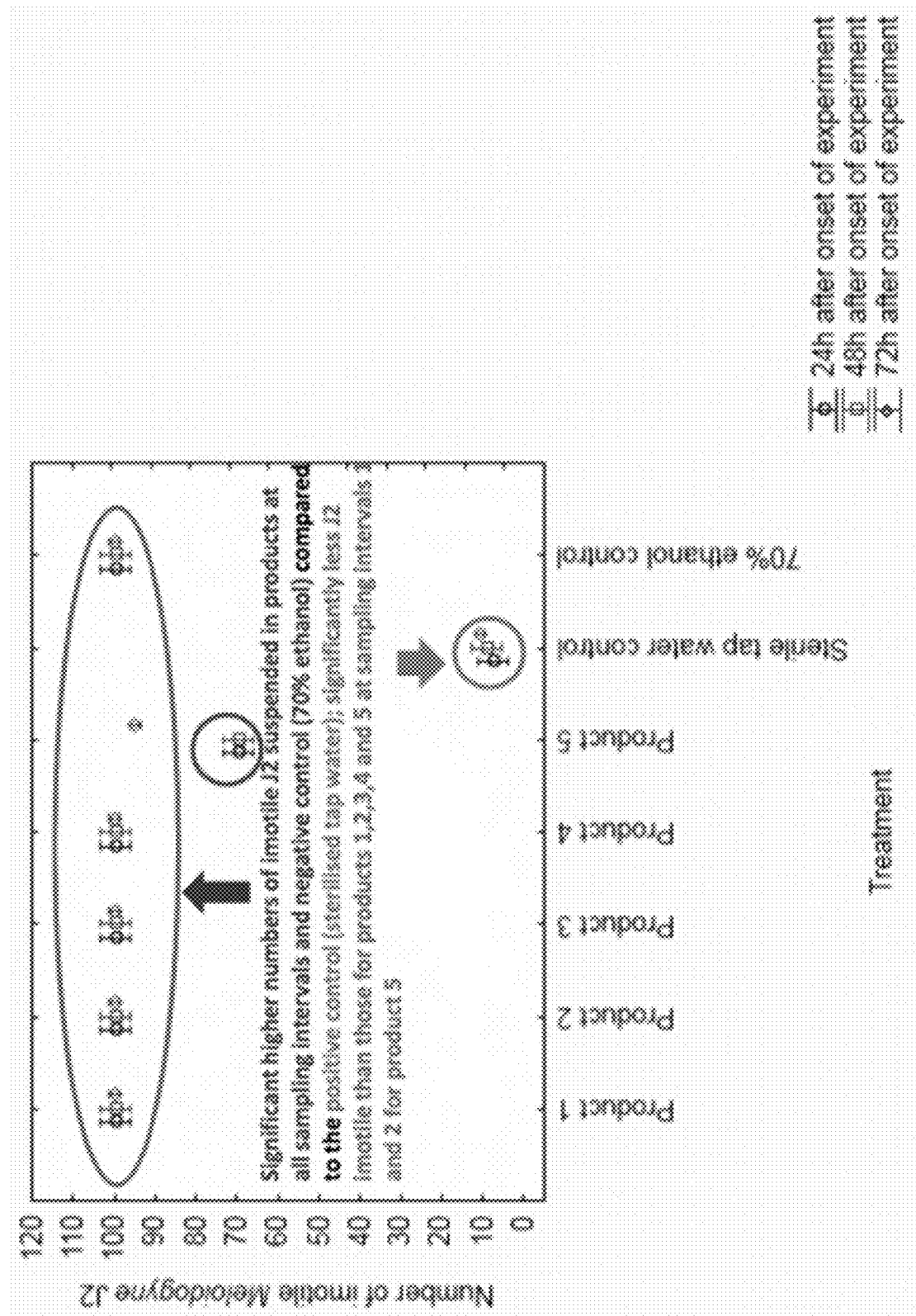

FIG. 2 is a graphic representation of immotile/paralyzed J2 nematodes of mixed *Meloidogyne* spp. populations. The current effect was noted at $F(12,70)=25.1888$, $p=0.000$. The vertical bars denote 0.95 confidence intervals. Products 1-5 and Product 7 (70% ethanol control) showed significantly higher numbers of immotile J2 nematodes at all sampling intervals compared to Product 6 (sterile tap water control), which showed significantly less immotile J2 nematodes. Product 5 showed slightly less efficacy than Products 1-4 and Product 7, but nevertheless showed significant effect on paralyzing J2 nematodes. Product 5 is the liquid mixture without aeration.

Figure 3:

FIG. 3 is an image taken at 100× magnification of immobilized J2 nematodes suspended in Product 1.

Figure 4:

FIG. 4 is an image taken at 100× magnification of immobilized J2 nematodes suspended in Product 2.

Figure 5:
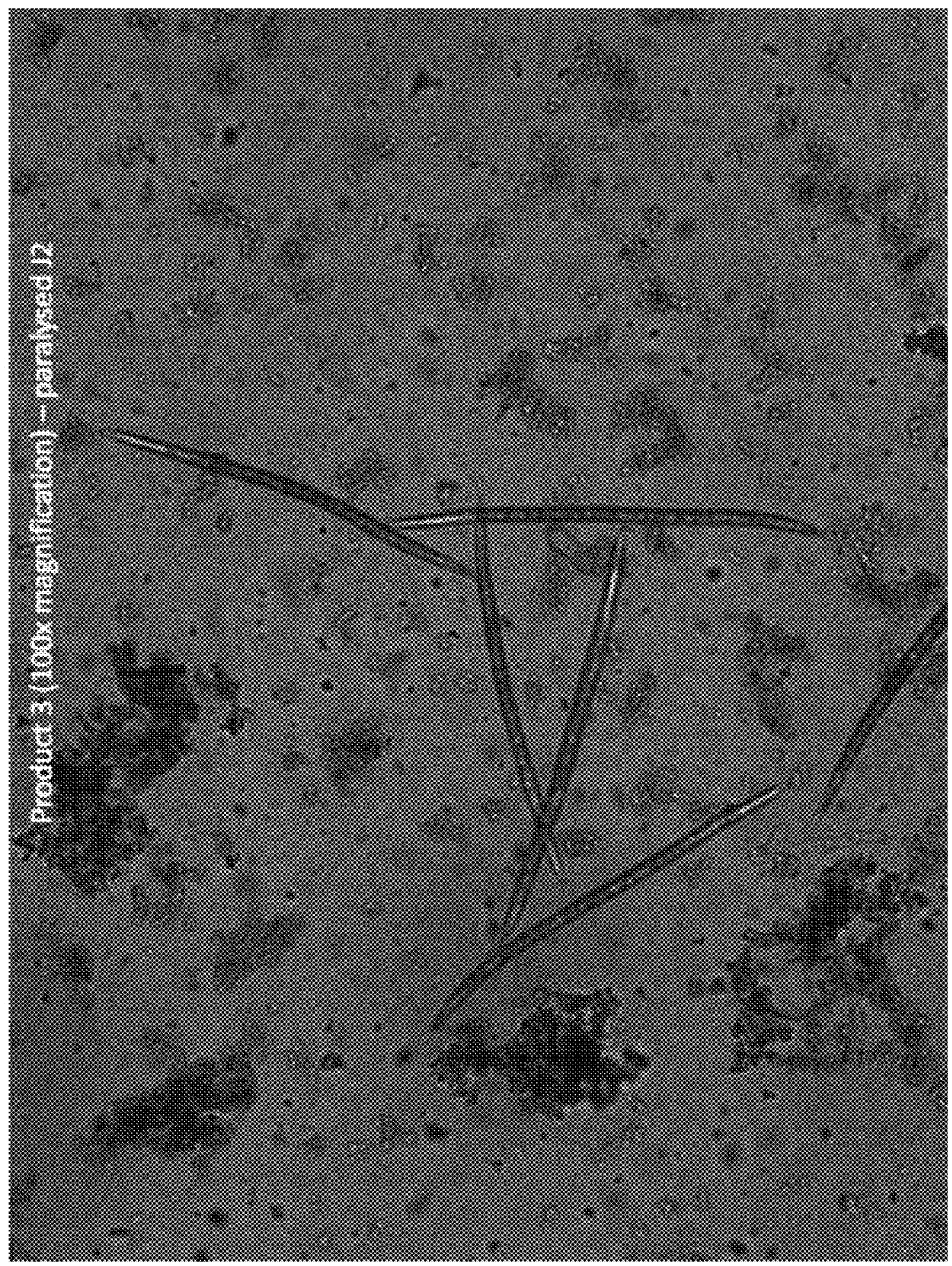

FIG. 5 is an image taken at 100× magnification of immobilized J2 nematodes suspended in Product 3.

Figure 6:

FIG. 6 is an image taken at 100× magnification of both immobilized and moving J2 nematodes suspended in Product 5.

Figure 7:
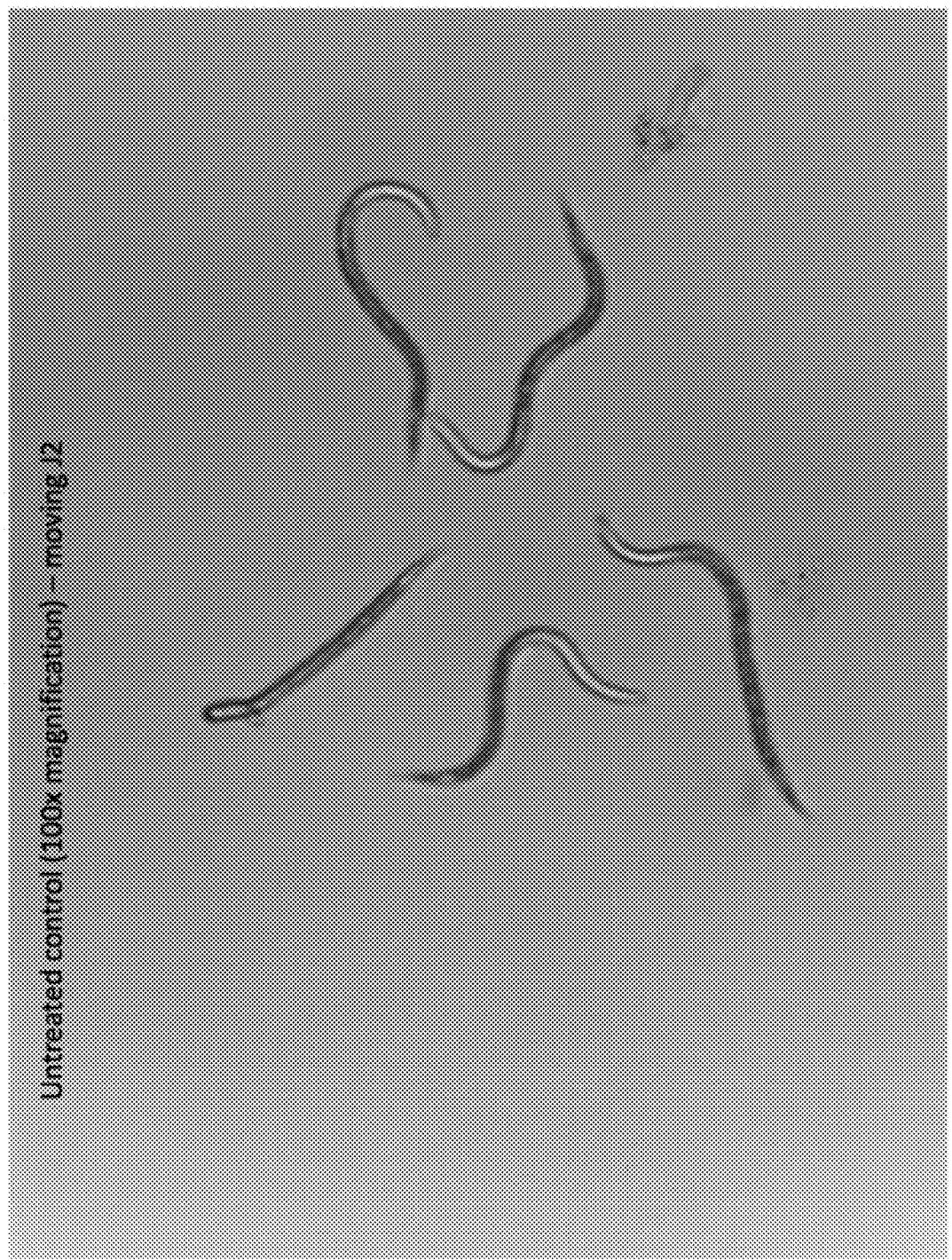

FIG. 7 is an image taken at 100× magnification moving J2 nematodes suspended in Product 6 (sterile tap water control).

Figure 8:
Figure 9A:
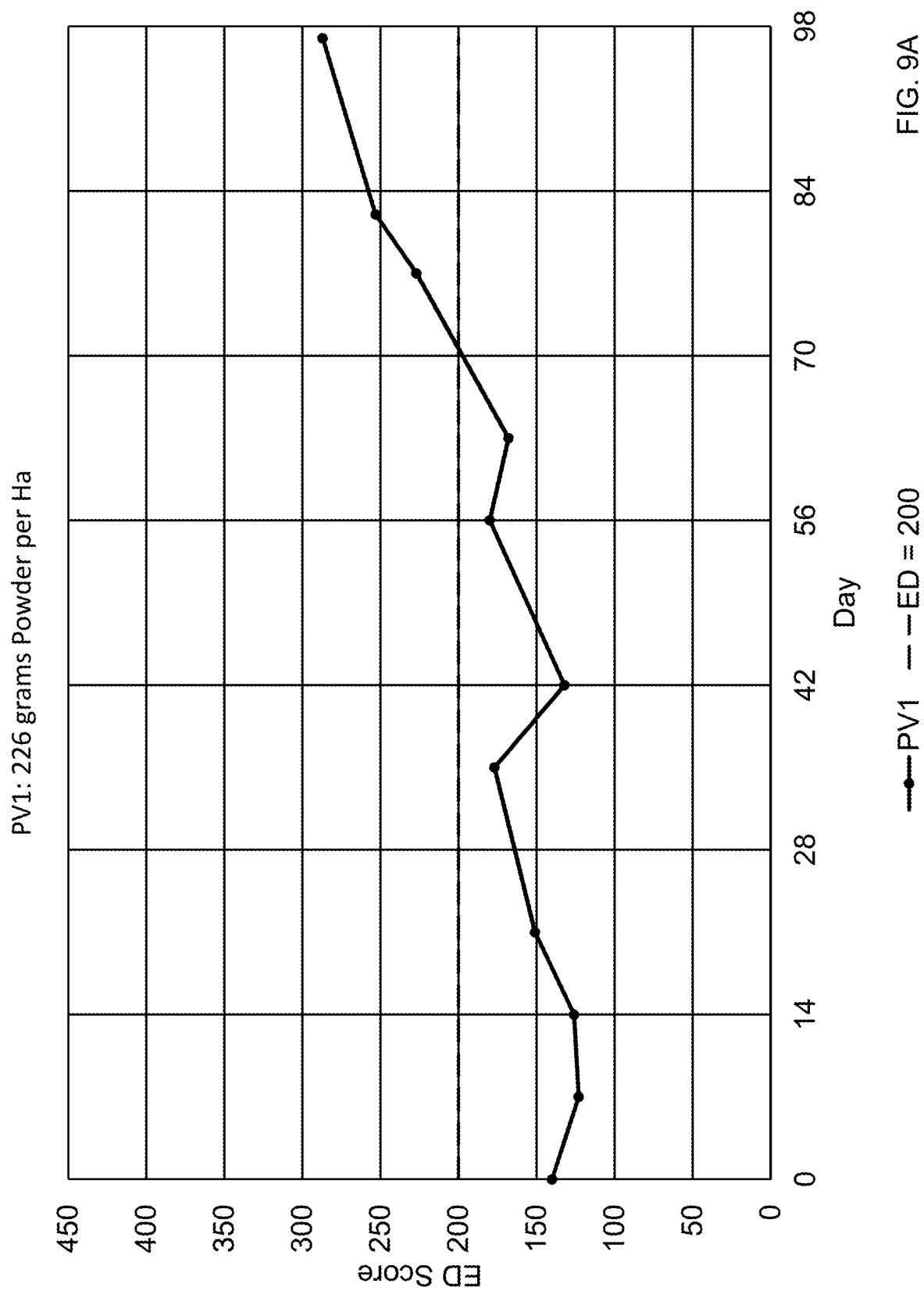
Figure 9B:
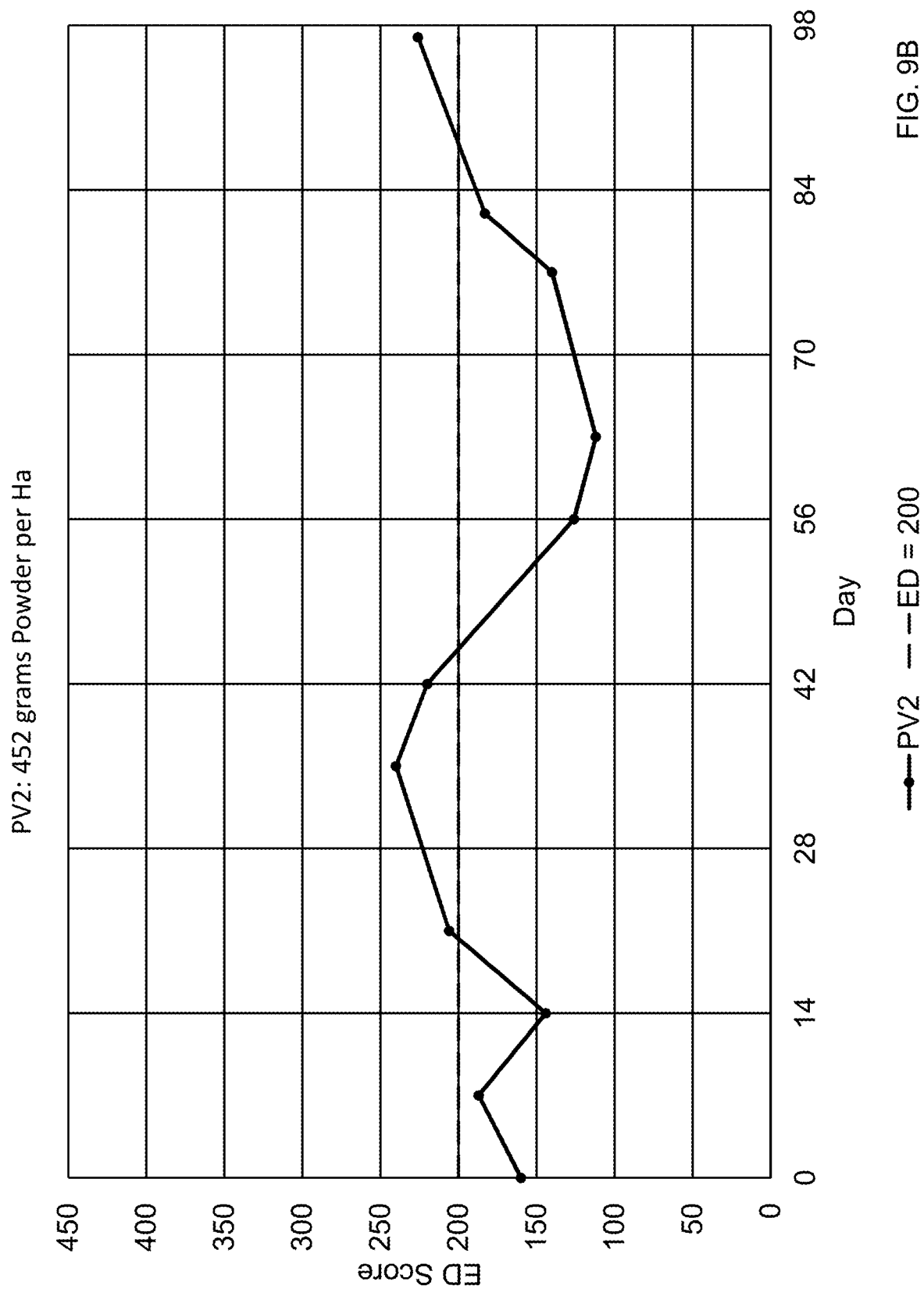
Figure 9C:
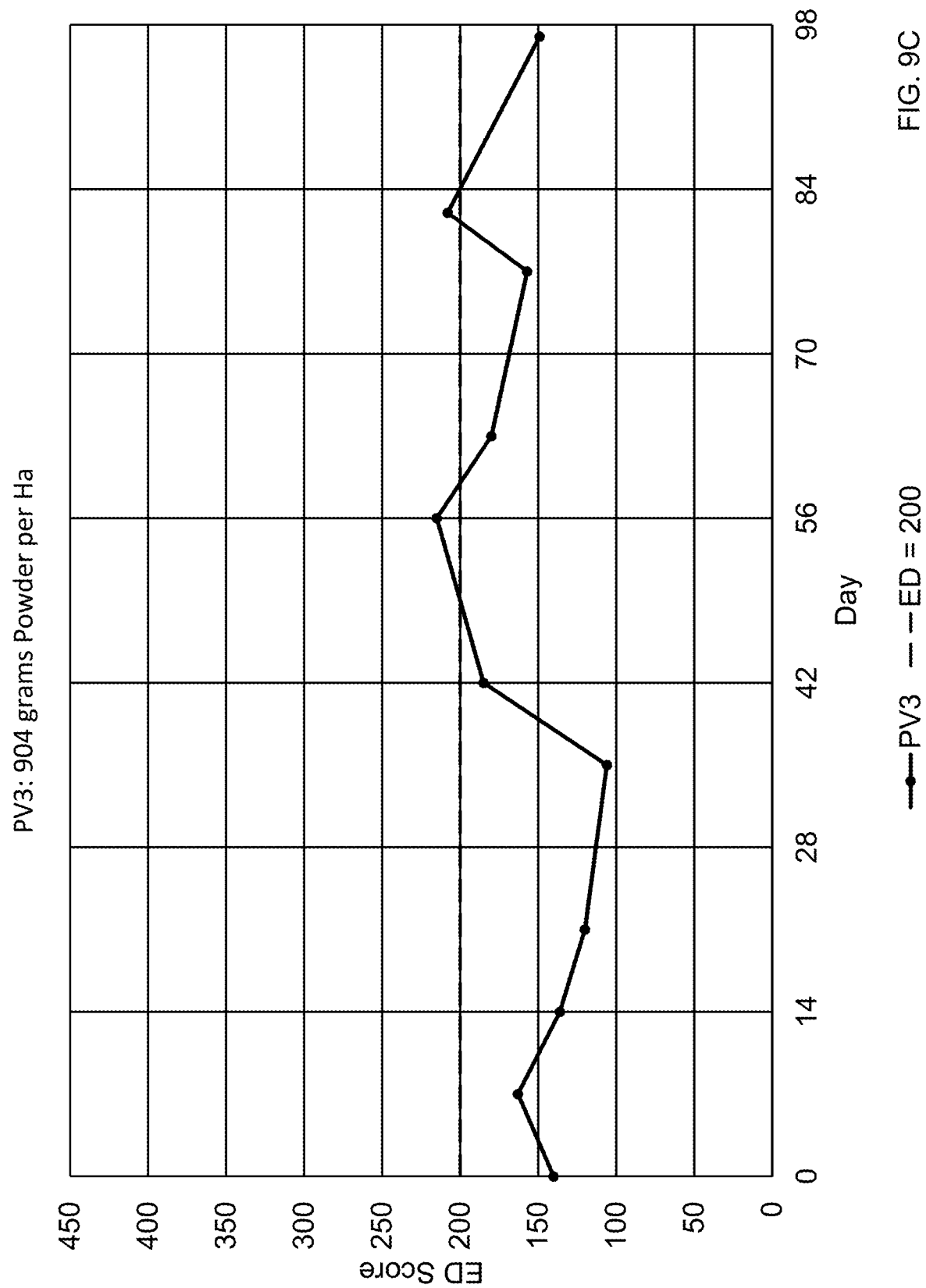
Figure 9D:
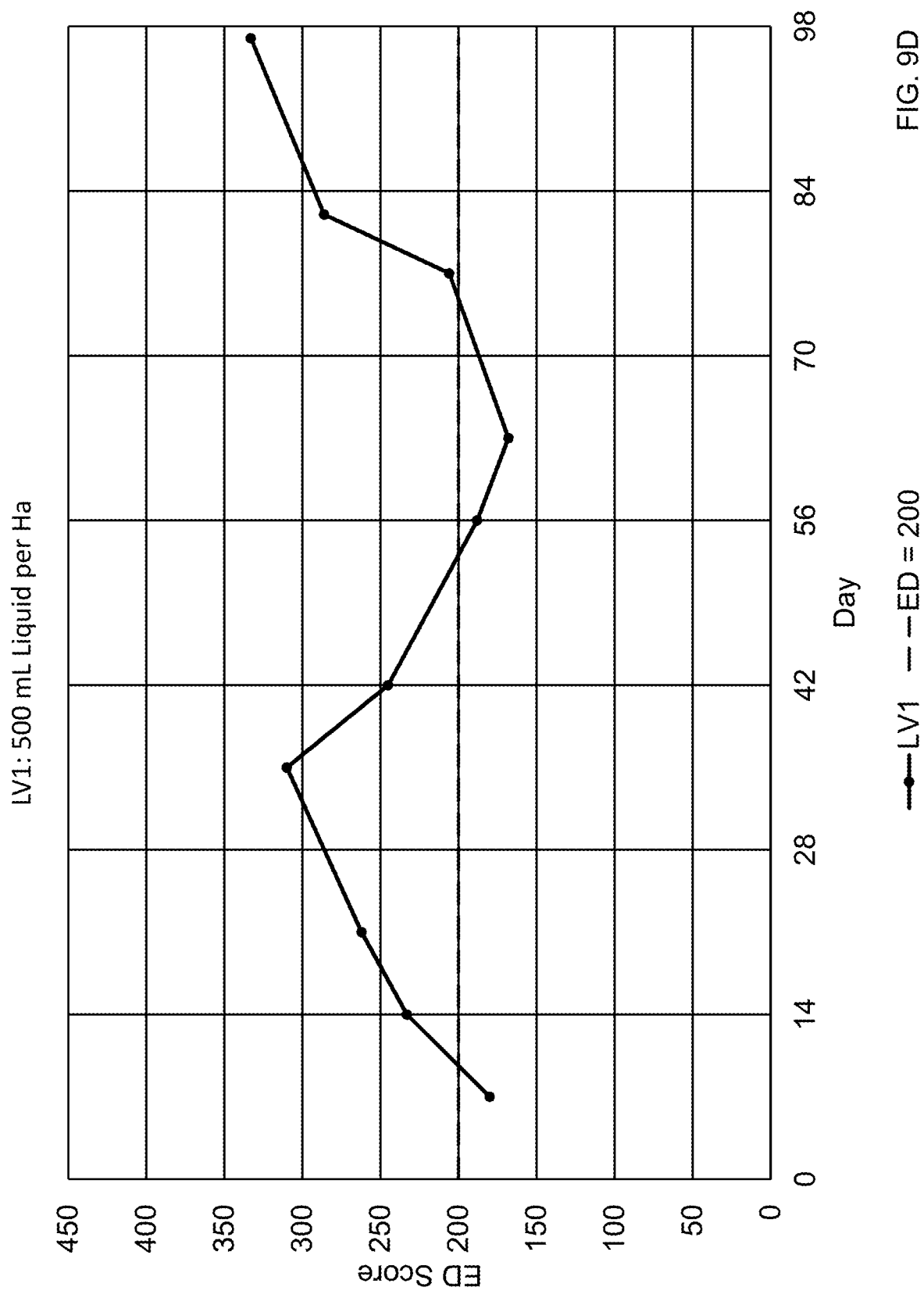
Figure 9E:
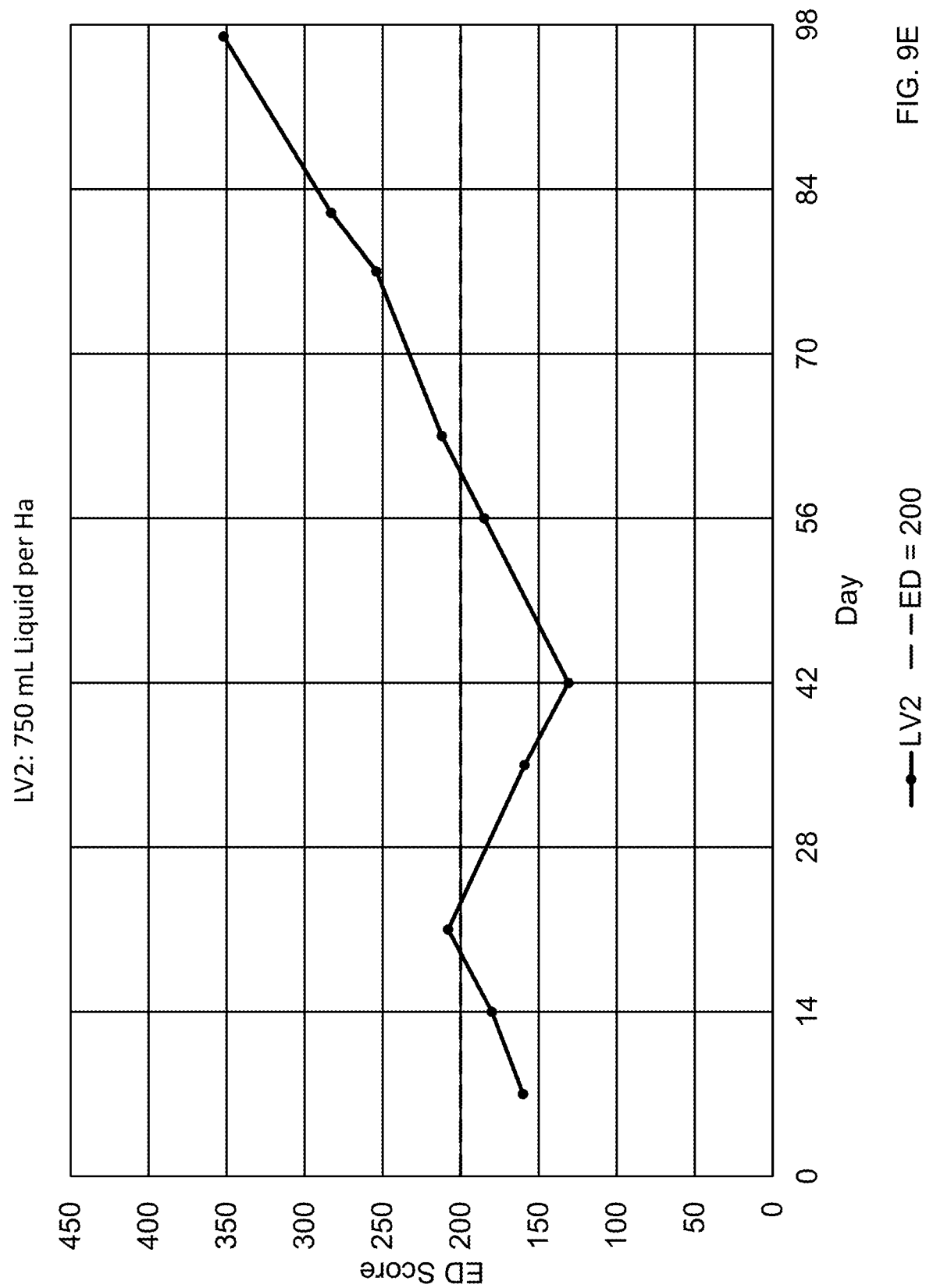
Figure 9F:
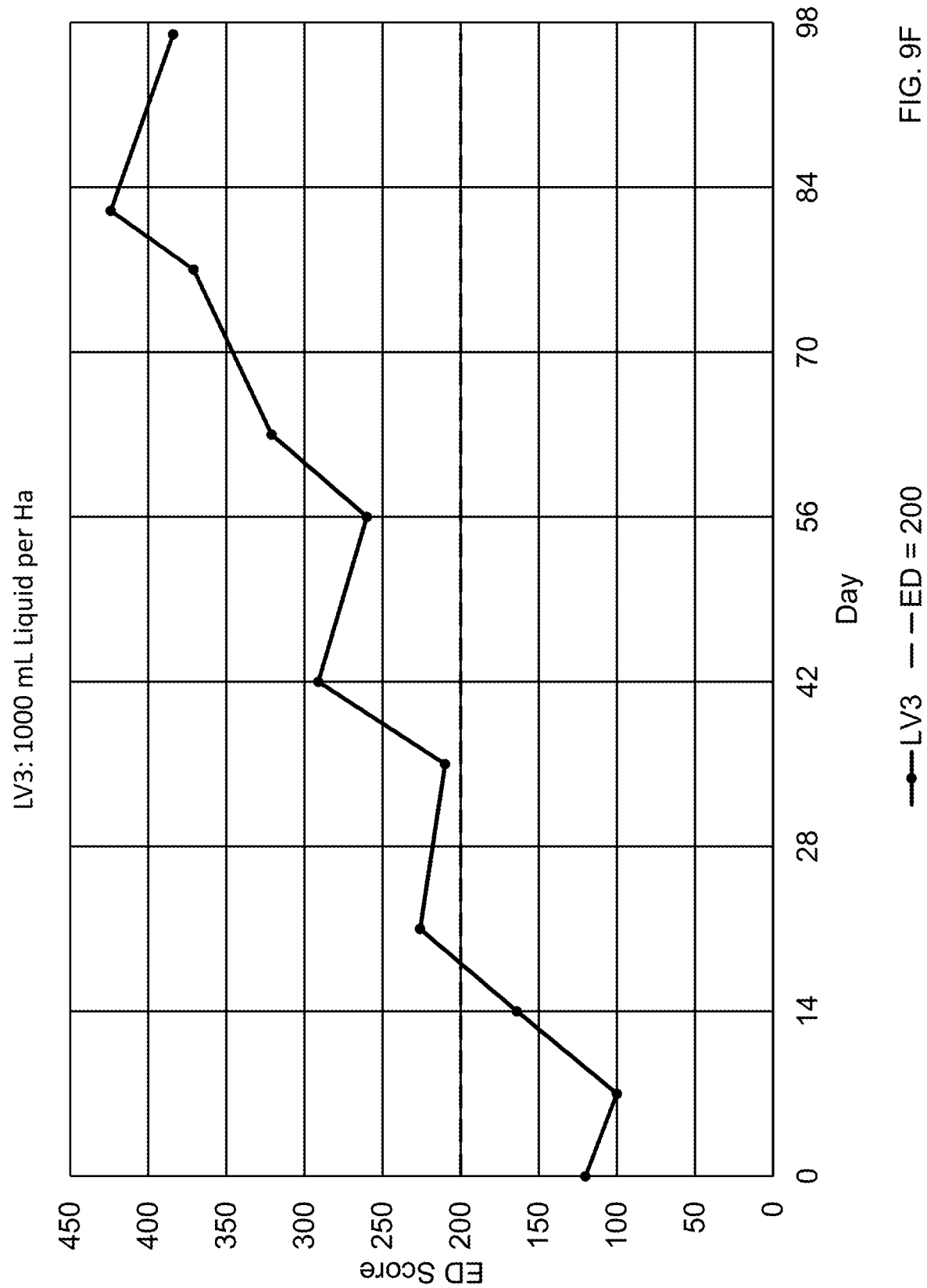
Figure 10:
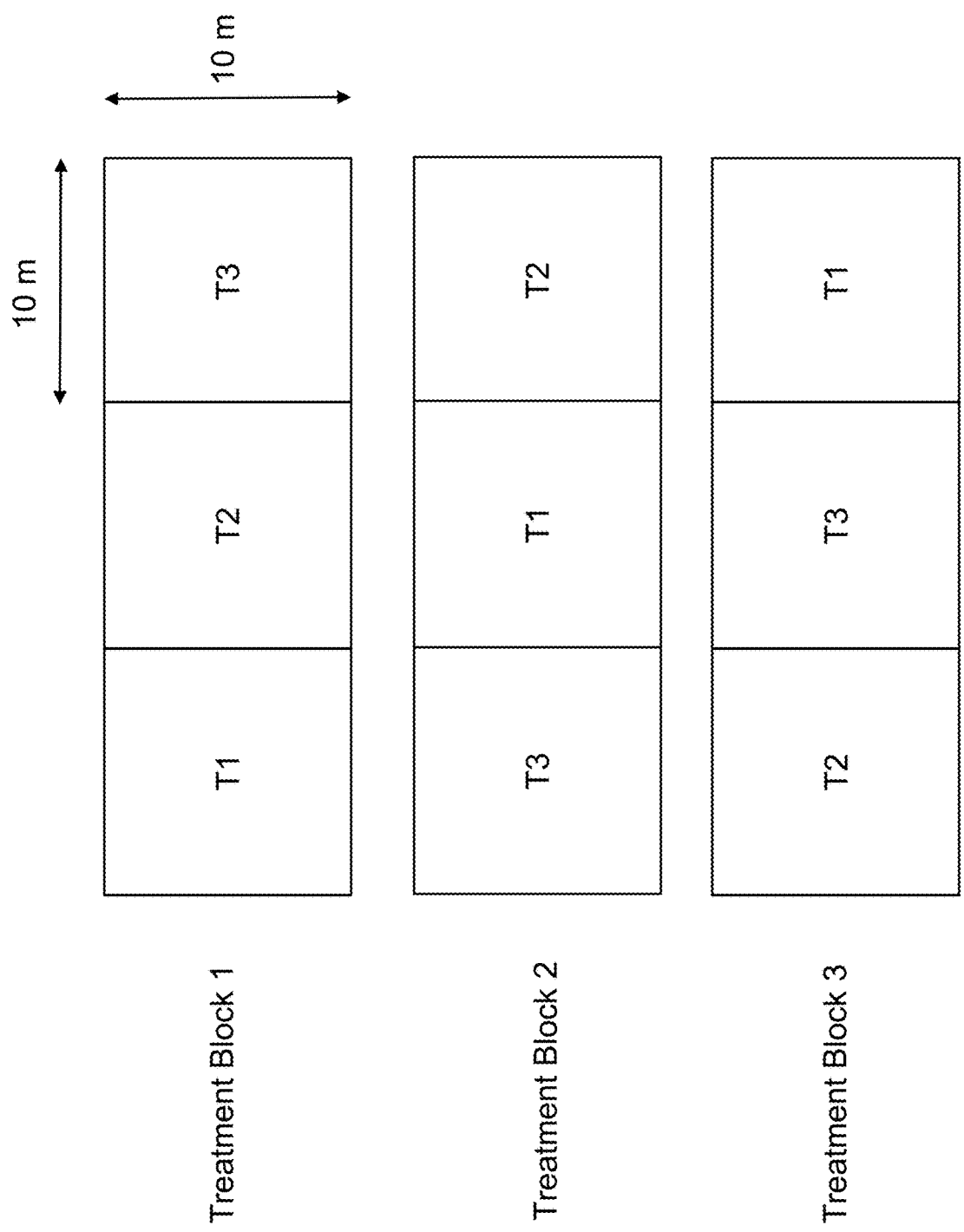
Figure 11:
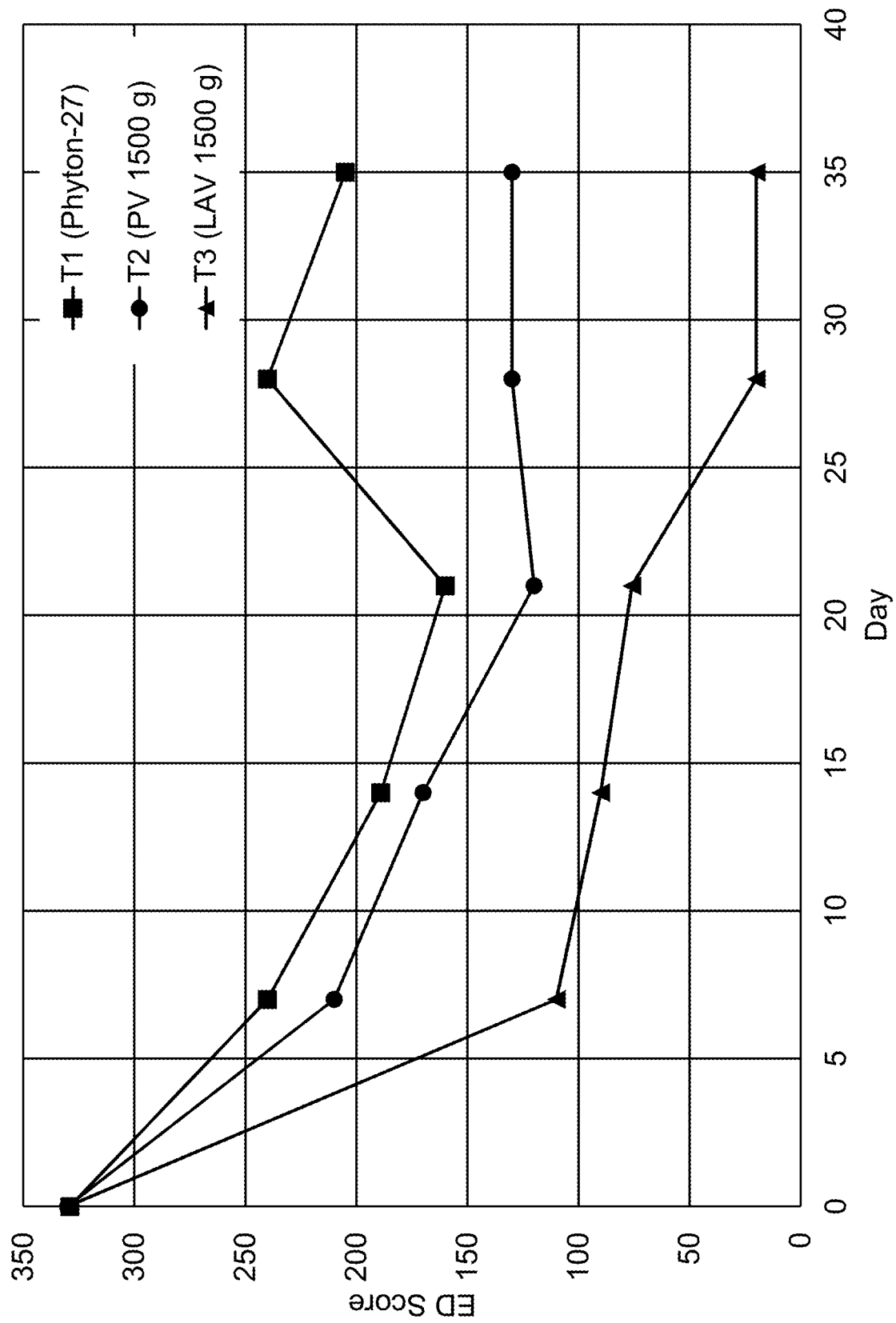

FIG. 8 is an image taken at 100× magnification of immobilized J2 nematodes suspended in Product 7 (70% ethanol negative control).

Discussion

Early during aeration, the key extracellular enzymes (e.g., chitinase, protease, etc.) were not produced in significant quantities by the bacteria in the composition. During the first 12 to 24 hours of aerobic growth (depending on the specific ratio of the composition to water), there remained sufficient soluble, bioavailable nutrients that supported logarithmic growth of the bacteria in the composition. After about 18 hours of aeration, the bacteria in the composition exhausted available soluble nutrients. The culture then entered a stationary/death phase growth pattern. At this time, the extracellular enzymes were produced at an accelerated rate, as the culture shifted from growth and reproduction into synthesis of extracellular enzymes that helped produce new soluble substrate from macromolecules that may have been present in the medium.

The extension of aeration past logarithmic growth into death phase growth is helpful in producing large amounts of the desired enzymes, whereas these enzymes are not produced at significant or useful concentrations during logarithmic growth.

The inclusion of finely milled chitin provides induces increased chitinase synthesis. The inclusion of chitin in the present disclosure induces maximum chitinase synthesis in those stationary/death phase *Bacillus* capable of producing chitinase.

As seen in the first and second set of experiments, mixing the dry bacterial composition with water alone did not show efficacy in pest control or showed reduced efficacy relative to aerated samples. Also, failing to include chitin in the composition resulted in loss of efficacy.

It may be possible to selectively choose degrading enzymes based on aeration time. For example, as shown in FIG. 1, chitinase is produced preferentially between 10 and 60 hours of aeration. Amylase and protease are produced preferentially at 18 to 48 hours of aeration, and cellulase and lipase are produced preferentially at 48 to 96 hours of aeration.

Fifth Set of Experiments

Chitinase efficacy was evaluated on a population of maize plants inoculated with a mixture of *Meloidogyne incognita* and *Meloidogyne javanica* nematodes. The dose per treatment and the frequency of treatment were the variables that were changed.

Materials and Methods

Eggs and second-stage juvenile (J2) nematodes of *M. incognita* and *M. javanica* (70:30 ratio) were extracted from the roots of infected tomato plants using the NaOCl-method. J2 were hatched by placing extracted eggs on a 25-μm-mesh sieve, submerged in a 5 cm deep container filled with tap water, and incubated at 26° C. for 48 hours.

Seven groups (six treatment groups, one control group) of six plastic pots, each having a 10 L capacity, were filled with sandy loam soil (5.3% clay, 93.6% sand, 1.1% silt, and 0.47% organic matter) having a pH of 6.8. Soil was fumigated with Telone® II (Dow AgroSciences, active substance 1,3-dichloropropene) at a dosage rate of 150 L/hectare (~15 gal/acre). Pots were maintained at a temperature of 21.6° C. to 29.4° C.

1 kg of the dry powder mix of Table 1 was added to 200 L of water, and vigorously aerated at 27° C. for 72 hours. Treatment was applied at 1 mL, 5 mL, or 10 mL per pot (see Table 5).

24 hours prior to planting, approximately 10,000 eggs and J2 (50:50 ratio) were inoculated and added to the top 5-10 cm of the soil in each pot. One seed of maize cultivar DKC 78-79 BR was then planted (approximately 4 cm deep) per pot, and the first treatment was applied to each pot. Plants were watered three times per week with 0.5 L tap water and after each treatment. Nutrifeed (Startke Ayres) was applied as liquid fertilizer (1 gram/liter water) after seedling emergence was observed and again 35 days later (0.5 liters applied each time, for a total of 1 gram Nutrifeed per pot). Treatment was applied in either 3 monthly applications or 9 weekly applications (see Table 5).

60 days after planting and inoculation, the root system of each plant was excised from the aerial parts, and the aerial mass weighed. The root system of each plant was subsequently removed from each pot, along with about 200 grams of rhizosphere soil, and each root system weighed. *Meloidogyne* spp. eggs and J2 were extracted from the soil obtained from each pot by an adapted NaOCl method, 1995). J2 were extracted from the extracted soil using a decanting-, sieving-, and sugar-flotation method. Eggs and J2 were counted in a counting dish using a stereomicroscope (60× magnification).

Nematode and aerial plant mass data were subjected to one-way ANOVA analysis with means separated by Tukey's HSD Test (* $p<0.05$, ** $p<0.01$).

Results

All treatment groups trended towards a reduction of egg+J2 nematode survival rates when compared to the control group, which showed an increase in egg+J2 nematode population. Treatment groups 4 (5 mL per each weekly treatment) and 5 (10 mL per each monthly treatment) had a statistically significant effect on egg+J2 nematode survival rates, as illustrated in Table 5.

TABLE 5

| Treatment group | Dosage per treatment | Treatment frequency | Eggs + J2 (mean count) |
|---|---|---|---|
| 1 | 1 mL | Monthly | 10,547 |
| 2 | 1 mL | Weekly | 10,692 |
| 3 | 5 mL | Monthly | 10,130 |
| 4 | 5 mL | Weekly | 4,073** |
| 5 | 10 mL | Monthly | 8,050* |
| 6 | 10 mL | Weekly | 13,225 |
| Control | N/A | N/A | 19,700 |

*p < 0.05 versus Control
**p < 0.01 versus Control

Sixth Set of Experiments

The compositions of the present disclosure were evaluated for their effect on the spread of fungal black sigatoka (*Mycosphaerella fijiensis*) disease on Cavendish banana (*Musa paradisiaca*) plants.

Materials and Methods

The compositions were tested on banana fields containing 2,226 plants/hectare located in the Dominican Republic over the course of 97 days. Six parcels of land, each 0.14 hectares (ha), were used.

The banana plants were about 3 months old at the beginning of the experiment, and were about 6 months old at the conclusion of the experiment. This period is considered the most critical time for development of black sigatoka. The testing time was also a period of high rainfall, which escalates progression of the disease.

A powder variant (PV) was tested, which had the composition of Table 6.

TABLE 6

| Common Name | Chemical Name | Mass Fraction | cfu/gram |
|---|---|---|---|
| Yeast extract | Yeast Extract | 0.768 | |
| Baking Soda | Sodium Bicarbonate | 0.155 | |

TABLE 6-continued

| Common Name | Chemical Name | Mass Fraction | cfu/gram |
|---|---|---|---|
| Ammonia | Ammonium Chloride | 0.013 | |
| Phosphate | Di Potassium Phosphate | 0.01 | |
| Epsom Salt | Magnesium Sulfate | 0.013 | |
| Bacteria | *Bacillus licheniformis* A | 0.003 | 1.67E+07 |
| Bacteria | *Bacillus licheniformis* B | 0.011 | 5.67E+07 |
| Bacteria | *Bacillus pumilis* | 0.003 | 1.67E+07 |
| Bacteria | *Bacillus amyloliquefaciens* | 0.003 | 1.67E+07 |
| Crab Shell (finely ground to 325 mesh or smaller) | Chitin | 0.018 | |
| | Total (does not equal 1 due to rounding) | 0.997 | 1.07E+08 |

A liquid variant (LV) was prepared from the PV according to Table 6, but did not contain chitin. Two kilograms of the LV powder was suspended in 1000 liters of water, aerated at 27° C. for 72 hours, and stored for 28 days at room temperature prior to use in the experiment. After 28 days, a well-mixed sample of the aqueous suspension was then filtered to remove the bacteria, and the remaining total organic carbon residual content was less than 25 ppm. The LV suspension was tested for chitinase activity, and none was detected. The LV suspension was then plated using differential plating techniques and verified by 16S PCR to contain the following amounts of bacteria:

| Bacteria | Amount (cfu/gram) |
|---|---|
| *Bacillus licheniformis* A | 1.20E+07 |
| *Bacillus licheniformis* B | 5.10E+07 |
| *Bacillus pumilis* | 1.30E+07 |
| *Bacillus amyloliquefaciens* | 1.10E+07 |
| Total | 8.70E+07 |

The banana field test plots were treated on Days 7, 21, 42, and 82 according to the dosing protocol of Table 7. Both the powder variant (PV, contains chitin) and the liquid suspension (LV, no chitin) were tested at low, medium, and high dosages. For the LV, the indicated amount of the liquid suspension was mixed into 20 liters of water, then applied to the test plot. For the PV, the indicated amount of the powder was mixed into 20 liters of water, then applied to the test plot.

TABLE 7

| Plot ID | Dose per Ha | Dose per plot |
|---|---|---|
| PV1 | 226 grams | 32 grams |
| PV2 | 452 grams | 64 grams |
| PV3 | 904 grams | 127 grams |
| LV1 | 500 ml | 70 ml |
| LV2 | 750 ml | 105 ml |
| LV3 | 1000 ml | 140 ml |

Results

The industry standard measuring and forecasting system for black sigatoka is described in Ganry et al., Fruits, 2008, vol. 63, pp 381-387. Generally, new fungal attacks are only detected on young leaves. The progression of black sigatoka is thus from the top to the bottom of the plant (worst at the top). Sporulation starts in necrotic stages of the disease, which is when the rate of infection is at its maximum. Thus, early detection and preventive/curative action is very important. The Youngest Leaf Spotted (in days) is combined with the Foliar Emission Rate to express the Evolutionary Development (ED) of the disease as a speed value. The higher this ED value, the greater the danger of reaching the necrotic stage. A lower Youngest Leaf Spotted value usually suggests increased virulence. The Foliar Emission Rate is the adjusted generation rate of new leaves per day. The ED value is used as a forecasting tool to identify when to apply fungicide. An ED value of 200 or higher is usually used as a threshold for initiation of fungal control application in the Dominican Republic.

The ED values for each of the six plots are indicated in Table 8 below, and are plotted as line graphs in FIGS. 9A-9F. The horizontal dashed line indicates the threshold ED value of 200. The graphs show a vastly lower magnitude and reduced rate of black sigatoka disease among the PV-treated test plots, relative to the LV-treated test plots. The LV treatments (no chitin) failed to maintain acceptable ED values. An inversely proportional correlation between PV dosage and ED can be further observed (that is, the higher the dosage, the lower the evolution of disease).

TABLE 8

| Day | PV1 (276 g) | PV2 (452 g) | PV3 (904 g) | LV1 (500 mL) | LV2 (750 mL) | LV3 (1000 mL) |
| --- | --- | --- | --- | --- | --- | --- |
| 0 | 140 | 160 | 140 | — | — | 120 |
| 7 | 123 | 187 | 163 | 180 | 160 | 100 |
| 14 | 126 | 144 | 136 | 233 | 180 | 164 |
| 21 | 151 | 206 | 120 | 262 | 208 | 226 |
| 35 | 177 | 240 | 106 | 310 | 159 | 210 |
| 42 | 132 | 220 | 185 | 245 | 131 | 291 |
| 56 | 180 | 126 | 215 | 188 | 185 | 260 |
| 63 | 168 | 112 | 180 | 168 | 212 | 321 |
| 77 | 227 | 140 | 157 | 206 | 254 | 371 |
| 82 | 253 | 183 | 208 | 286 | 283 | 424 |
| 97 | 287 | 226 | 149 | 333 | 352 | 384 |

As long as treatment was applied every two to four weeks, the bacterial compositions were effective. In comparison, chemical treatments were similarly effective when applied every four weeks.

It is noted that the PV variant applied was not aerated over time as in the earlier experiments. It is believed that doing so would increase the potency of the liquid mixture, because chitinase synthesis would be much higher (by about 5 to 10 times). This would permit control of ED values with a lower dose, less frequent application, or a combination of both.

Seventh Set of Experiments

In the Sixth Set of Experiments, the liquid variant (LV) did not include chitin powder, and contained only bacteria. As the dose of the LV was increased from 500 mL to 750 mL to 1000 mL per Ha, improved suppression of Black Sigatoka was not evident. In contrast, the powder variant (PV) did include chitin, and as the dose of the PV increased from 226 grams to 454 grams to 904 grams per hectare, the efficacy improved.

Thus, in the Seventh Set of Experiments, a liquid activated variant (LAV) was prepared using the PV of Table 6. The PV and the LAV were then tested on banana fields containing 2,222 plants/hectare (2 plants per 9 $m^2$) located in the Dominican Republic over the course of 35 days. Dosing began 90 days after planting.

Materials

The LAV was prepared as follows. 200 liters of water were added to an open top, 55 gallon drum. The drum was equipped with 25 liters per minute of diffused air, and a small 100 watt, submersible, aquarium heater to maintain temperature at 27° C. Before aeration began, the 200 liters of water was chlorinated to sterilize, then dechlorinated, and brought to 27° C. 908 grams (2 lbs) of the PV of Table 6 was added to the aerating drum. Aeration was maintained for 72 hours, at which time the batch was considered complete. The liquid from the aerating drum was used within 24 hours of completion.

For both the PV and the LAV, 1500 grams per Ha was used as the chosen dosage rate. This was higher than the strongest dose of 908 grams per hectare used in the Sixth Set of Experiments.

For comparison, Phyton-27 fungicide (Phyton Corporation, Bloomington, Minn.) was also applied to separate plots. Phyton-27 is a broad-spectrum, systemic bactericide and fungicide. Phyton-27 contains copper sulphate pentahydrate (21.4%), equivalent to 5.43% copper metal. 1 liter of Phyton-27 is used to treat 1 hectare. 1 Liter Phyton-27 is diluted into 100 gallons of water, then applied.

Three widely spaced Treatment Blocks were used for the experiments. Each Block was then divided into three distinct treatment cells T1, T2, and T3. Each treatment cell had an area of 10 meters×10 meters (100 $m^2$). In each Treatment Block, cell T1 was treated with Phyton-27, cell T2 was treated with the powder variant (PV), and cell T3 was treated with the liquid activated variant (LAV). FIG. 10 shows the layout of the treatment cells and treatment blocks.

Methods

Each treatment cell received three product applications, specifically at 90, 104 and 118 days after planting (i.e. days 0, 14, and 28 after first dosing).

Each treatment cell T1 received a dose of 10 mL Phyton-27. A single 20-liter backpack sprayer was loaded with 54.6 mL Phyton-27 and filled with water, and used to dose each treatment cell T1. Each cell T1 was dosed with 3.67 liters of backpack solution.

To dose each treatment cell T2, 81.7 grams of PV was added to 20 liters of water in the backpack sprayer. Each cell T2 was dosed with 3.67 liters of backpack solution, which corresponded to 1500 grams PV per hectare. (Note the PV is not activated compared to the LAV.)

To dose each treatment cell T3, 18 liters of well mixed LAV was added to the 20 liter backpack sprayer, and another 2 liters of water was added to fill the backpack sprayer to the 20 liter level. Once diluted this way, the backpack sprayer contained the equivalent of 81.7 grams of PV (before activation) in the 20 liters. Each cell T3 was dosed with 3.67 liters of backpack solution, which corresponded to 1500 grams PV per hectare. As noted, for T3 treatments, the PV was subjected to an "activation" procedure to obtain the LAV.

Results

The average ED values for each of the three treatment cells are indicated in Table 9 below, and are plotted in FIG. 11 over time.

TABLE 9

| Day | T1 (Phyton-27) | T2 (PV 1500 g) | T3 (LAV 1500 g) |
|---|---|---|---|
| 0 | 329 | 330 | 330 |
| 7 | 240 | 210 | 110 |
| 14 | 189 | 170 | 90 |
| 21 | 160 | 120 | 76 |

TABLE 9-continued

| Day | T1 (Phyton-27) | T2 (PV 1500 g) | T3 (LAV 1500 g) |
|---|---|---|---|
| 28 | 240 | 130 | 20 |
| 35 | 205 | 130 | 20 |

Phyton-27 slowed the progression of Black Sigatoka, but the average ED score was 206. Control was attained, but the disease remained at or above the danger level (ED=200). After the initial dose, the average ED score was 152 for the powder variant (PV), while the average value for the activated variant (LAV) was 63.

This data showed that inclusion of ground chitin in the LAV formulation increased its efficacy relative to the LV of Table 8. Increasing doses of the PV resulted in increased suppression of Black Sigatoka (Compare Table 8 to Table 9). The activated variant (LAV) outperformed both the PV and Phyton-27.

Eighth Set of Experiments

Of the various pests that affect golf course turf in Florida, nematodes are among the most difficult to manage. Nematode infestations are common and severe in Florida as the climate and sandy soils provide a perfect habitat for many of the most destructive nematode species. A trial was conducted on a golf course using the powder variant (PV) of Table 6.

The PV was activated to optimize its activity. A liquid activated variant (LAV) was prepared from the PV as follows. 100 liters of tap water were added to a tank, chlorinated to sterilize, then dechlorinated. The tank was brought up to 27° C. using a 40 watt aquarium style heater. Aeration was supplied at a rate of 20 liters per minute through a submerged, medium bubble, alumina airstone. One pound of the PV was added to the aerating tank, and allowed to aerate for 72 hours.

The dose rate was one pound (454 grams) of the PV per acre. The golf course green evaluation area had a size of about 0.057 acres, so 5.7 liters of the LAV was used.

A first core sampling of the golf course was taken on day 0. The LAV was applied on days 25 and 39. A second core sampling was then taken on day 52. The core samplings were analyzed for the presence of lance nematodes (Hoplolaimus) and root knot nematodes (*Meloidogyne*). The results are shown in Table 10 below.

TABLE 10

|  | Day 0 | Day 52 | % reduction |
|---|---|---|---|
| Per 100 cc of soil | | | |
| lance (*Hoplolaimus*) | 520 | 270 | −48.1 |
| root knot (*Meloidogyne*) | 400 | 130 | −67.5 |
| Per gram of dry root | | | |
| lance (*Hoplolaimus*) | 942 | 233 | −75.3 |
| root knot (*Meloidogyne*) | 491 | 266 | −45.8 |

Use of the LAV produced a 45% to 75% reduction in the problematic Lance and Root Knot nematode population.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

The invention claimed is:

1. A dry composition, comprising:
   at least two strains of bacteria that produces chitinase, wherein the at least two strains of bacteria comprises *B. licheniformis* and *B. amyloliquefaciens*;
   from 63 wt % to 93 wt % of yeast extract;
   from 0.09 wt % to 5.5 wt % of ammonium chloride;
   from 0.09 wt % to 5.5 wt % of a phosphate-containing compound;
   from 0.09 wt % to 5.5 wt % of magnesium sulfate;
   from 4.5 wt % to 22 wt % of a buffer; and
   from 0.09 wt % to 16.5 wt % of chitin.

2. The dry composition of claim 1, wherein the at least two strains of bacteria comprise *B. licheniformis*, *B. pumilis*, and *B. amyloliquefaciens*.

3. The dry composition of claim 2, wherein a weight ratio of *B. licheniformis* to a sum of *B. pumilis* and *B. amyloliquefaciens* is from about 2:1 to about 3:1.

4. The dry composition of claim 1, wherein the ammonium chloride comprises from 0.25 wt %±10% to 3 wt %±10%, or from 1 wt %±10% to 2 wt %±10%, or from 1 wt %±10% to 1.5 wt %±10% of the dry composition.

5. The dry composition of claim 1, wherein the phosphate-containing compound comprises dipotassium phosphate, phosphoric acid, diammonium phosphate, disodium phosphate, monosodium phosphate, or sodium tripolyphosphate; or
   wherein the phosphate-containing compound comprises from 0.1 wt %±10% to 1 wt %±10%, or from 0.5 wt %±10% to 0.75 wt %±10% of the dry composition.

6. The dry composition of claim 1, wherein the magnesium sulfate comprises from 0.1 wt %±10% to 1 wt %±10%, or from 0.5 wt %±10% to 0.75 wt %±10% of the dry composition.

7. The dry composition of claim 1, wherein the buffer comprises baking soda or soda ash; or
   wherein the buffer comprises from from 7 wt %±10% to 16 wt %±10%, or from 12 wt %±10% to 15 wt %±10% of the dry composition.

8. The dry composition of claim 1, wherein the chitin comprises from 0.1 wt %±10% to 5 wt %±10% of the dry composition.

9. A method of preparing a liquid mixture for pest control, comprising:
   combining (A) a dry composition comprising: at least two strains of bacteria that produces chitinase, wherein the at least two strains of bacteria comprise *B. licheniformis* and *B. amyloliquefaciens*; from 63 wt % to 93 wt % of yeast extract; from 0.09 wt % to 5.5 wt % of ammonium chloride; from 0.09 wt % to 5.5 wt % of a phosphate-containing compound; from 0.09 wt % to 5.5 wt % of magnesium sulfate; from 4.5 wt % to 22 wt % of a buffer; and from 0.09 wt % to 16.5 wt % of chitin, with (B) water, to obtain the liquid mixture.

10. The method of claim 9, wherein 1 to 2 pounds of the dry composition is combined with from 100 liters to 400 liters of water; or
    wherein the weight/volume ratio of the dry composition to the water is from 0.0025 lb/liter±10% to 0.02 lb/liter±10%.

11. The method of claim 9, further comprising aerating the liquid mixture for a first time period at a first temperature to produce an aerated liquid mixture containing chitinase.

12. The method of claim 11, wherein the first time period is from 8 hours to 168 hours, or from 24 hours to 120 hours, or from 48 hours to 72 hours, or from 72 hours to 150 hours; or
    wherein the first temperature is from 15° C. to 40° C., or from 23° C. to 40° C., or from 23° C. to 30° C.; or
    wherein the liquid mixture remains within a pH range of 6.5 to 9.5 during the aerating.

13. A method of controlling nematodes around plants, comprising spraying a liquid mixture on or around the plants, wherein the liquid mixture is produced by combining (A) a dry composition comprising: at least two strains of bacteria that produce chitinase, wherein the at least two strains of bacteria comprise *B. licheniformis* and *B. amyloliquefaciens*; from 63 wt % to 93 wt % of yeast extract; from 0.09 wt % to 5.5 wt % of ammonium chloride; from 0.09 wt % to 5.5 wt % of a phosphate-containing compound; from 0.09 wt % to 5.5 wt % of magnesium sulfate; from 4.5 wt % to 22 wt % of a buffer; and from 0.09 wt % to 16.5 wt % of chitin with (B) water, to obtain the liquid mixture.

14. The method of claim 13, wherein 100 liters of the liquid mixture is applied on 2000 $m^2$ to 4000 $m^2$ of ground containing the plants.

\* \* \* \* \*